United States Patent [19]

Palac

[11] 4,012,773

[45] Mar. 15, 1977

[54] COLOR TELEVISION PICTURE TUBES WITH IMPROVED IMPLOSION PROTECTION SYSTEM

[75] Inventor: Kazimir Palac, Carpentersville, Ill.

[73] Assignee: Zenith Radio Corporation, Chicago, Ill.

[22] Filed: Nov. 17, 1975

[21] Appl. No.: 632,559

[52] U.S. Cl. .......... 358/245

[51] Int. Cl.[2] .......... H04N 5/65

[58] Field of Search .......... 178/7.8, 7.82; 220/2.1 A, 2.3 A; 313/477

[56] References Cited

UNITED STATES PATENTS

| | | | |
|---|---|---|---|
| 3,200,188 | 8/1965 | Lange et al. | 178/7.82 |
| 3,340,358 | 9/1967 | Gier et al. | 178/7.82 |
| 3,835,250 | 9/1974 | Kaljuko et al. | 178/7.82 |

*Primary Examiner*—Robert L. Griffin
*Assistant Examiner*—Aristotelis M. Psitos
*Attorney, Agent, or Firm*—John R. Garrett

[57] ABSTRACT

This disclosure depicts a novel facebond system for implosion protecting a rectangular, shadow mask type color television picture tube having a flangeless faceplate with a central viewing area and a relatively wide peripheral non-viewing area. The facebond system is illustrated as comprising, in its most general sense, a metal high tensile strength frame having a curvature similar to the curvature of the faceplate and having substantially the same rectangular shape and size of the faceplate. The frame has a substantially rectangular central window slightly larger than the viewing area of the faceplate and is bonded to the non-viewing area of the faceplate so as to environ the viewing area thereof. The system assists in retaining in position the shards of a shattered faceplate and thereby provides for a relatively gradual buildup of pressure in the tube.

4 Claims, 4 Drawing Figures

COLOR TELEVISION PICTURE TUBES WITH IMPROVED IMPLOSION PROTECTION SYSTEM

CROSS REFERENCE TO RELATED APPLICATIONS

This application relates to, but is in no way dependent upon, U.S. Pat. Nos. 3,912,963; 3,890,526; and 3,894,260 and co-pending applications Ser. No. 395,334, filed Sept. 7, 1973; Ser. No. 498,836, filed Aug. 19, 1974 (continuation of Ser. No. 285,985, filed Sept. 5, 1972 but now abandoned); Ser. No. 527,001 filed Nov. 27, 1974; Ser. No. 528,533 filed Nov. 29, 1974; Ser. No. 603,975 filed Aug. 12, 1975; Ser. No. 623,854 filed Oct. 20, 1975; and Ser. No. 623,853, filed Oct. 20, 1975. All are of common ownership herewith.

BACKGROUND OF THE INVENTION

This invention relates in general to color television picture tubes and in particular, to a system for implosion protecting such tubes. Conventionally, a color television picture tube has a glass bulb including a funnel, a flanged faceplate sealed to the flared end of the funnel, and an electron gun assembly mounted in the funnel neck for providing a source of cathode rays. The faceplate has a concave inner surface on which is deposited an electron-excitable phosphor screen. After the faceplate is sealed to the funnel, the glass bulb is evacuated and, as a result, a ton or more of atmospheric pressure is exerted against the external surface of the faceplate. A glass bulb of this type is subject to implosion. The term "implosion" is defined by Underwriters Laboratory Incorporated as a "rapid and sudden inward bursting of a high-vacuum glass envelope." It is of the utmost importance in the interest of safety to prevent the faceplate from violently shattering should it be struck for example, by a heavy missile, for when a bulb implodes, fragments of glass may fly forwardly from the tube toward the viewer.

Three basic approaches for implosion protecting color cathode ray tubes (CRT's) have evolved. These three approaches employ different principles of operation. One approach is implemented in systems referred to as "rimbond" system. The rimbond system has a scalloped metal frame which surrounds the flange found on every conventional faceplate. The gap between the frame and the faceplate flange is filled with cement—typically an epoxy cement. In a rimbond system, the frame is not under tension. The cement holds in position the pieces of glass of a shattered faceplate long enough for air to enter the tube through the cracks formed so that pressure builds up in the tube relatively slowly. This prevents unacceptable amounts of glass from being projected forwardly from the tube, although the tube may still collapse. Patents illustrating such rimbond systems are U.S. Pat. Nos. 3,485,407; 3,558,818; 3,412,203 and 3,835,250. A major drawback to such rimbond systems has been the large amounts of very costly epoxy cement needed to adhere the metal frame to the faceplate.

A second basic implosion protection approach is termed the "tension band" approach. Systems implementing this approach comprise a strap or band which is placed around the faceplate flange and put under very high tensile force. Numerous patents have been issued on various aspects of tension band systems. See U.S. Pat. Nos. 3,818,557; 3,777,057; 3,845,530; and 3,890,464. The tension band systems, however, also have several drawbacks. When the tension band is tightened about the faceplate flange, it is very likely that the glass will be scratched as the band moves across it during the tightening process. This creates flaws at the location of the scratches, increasing the possibility of cracks forming there during implosion. Also, the distribution of forces applied to the faceplate flange by the band is irregular. Specifically, the forces applied at the corners by the band are much greater than the forces applied at the sides of the faceplate flange. In some of the tension band systems, an adhesive material is used under the tension band before tightening. The drawback here, however, is that as the tension band is tightened, there is a tendency to press away the adhesive material.

A third basic system is the face shield system (commonly referred to as "bonded panel") which was the original system developed to protect color television tubes from implosion. This system consists of a section of transparent plate glass having the size, shape and dished contour of the front surface of the faceplate of the picture tube. The plate glass is bonded to the faceplate with a clear resin. Since the television picture must be viewed through the face shield system, optical clarity is imperative. Many rejects occur due to bubbles forming in the resin which must be poured in between the faceplate and the shield. It is a prohibitively expensive system in the present picture tube market. Patents disclosing such systems are U.S. Pat. Nos. 3,315,035; 3,321,099; and 3,708,622.

A U.S. Pat. No. 2,222,197 to Engels discloses a CRT in which the CRT envelope comprises a curved, flangeless, faceplate inset in an expanded open end of a cooperating funnel. A band allegedly providing implosion protection surrounds the funnel near the open end thereof in a plane intersecting the faceplate ensconsed within the funnel mouth. The Braun system is quite different from the present system. No frame of any sort is provided. The implosion band environs the funnel rather than the faceplate peripheral edge. A comparison of the Engels' system and present system will reveal other important differences also.

This invention is believed to be most useful when applied to a unique tube having a flangeless faceplate. Such a tube is disclosed in U.S. Pat. No. 3,894,260, issued to the assignee of this application. The tube has a flangeless, curved, glass faceplate, a concave inner surface of which receives a phosphor screen. The funnel portion of this unique tube has a convex seal land which matches and mates with the curvature of the concave inner surface of the faceplate. Since the faceplate is flangeless, the sealing interface between the funnel and faceplate is curved rather than planar as in conventional tubes. Conventional rimbond and tension band system structures, as described above for implosion protection, would not appear to be readily adaptable for use with this tube.

OBJECTS OF THE INVENTION

It is a general object of the present invention to provide for a color television picture tube an improved system for implosion protection.

It is a more specific object of the present invention to provide an effective and low cost implosion protection system for a unique color television picture tube having a flangeless faceplate.

DESCRIPTION OF THE PREFERRED EMBODIMENT

Figure 1:
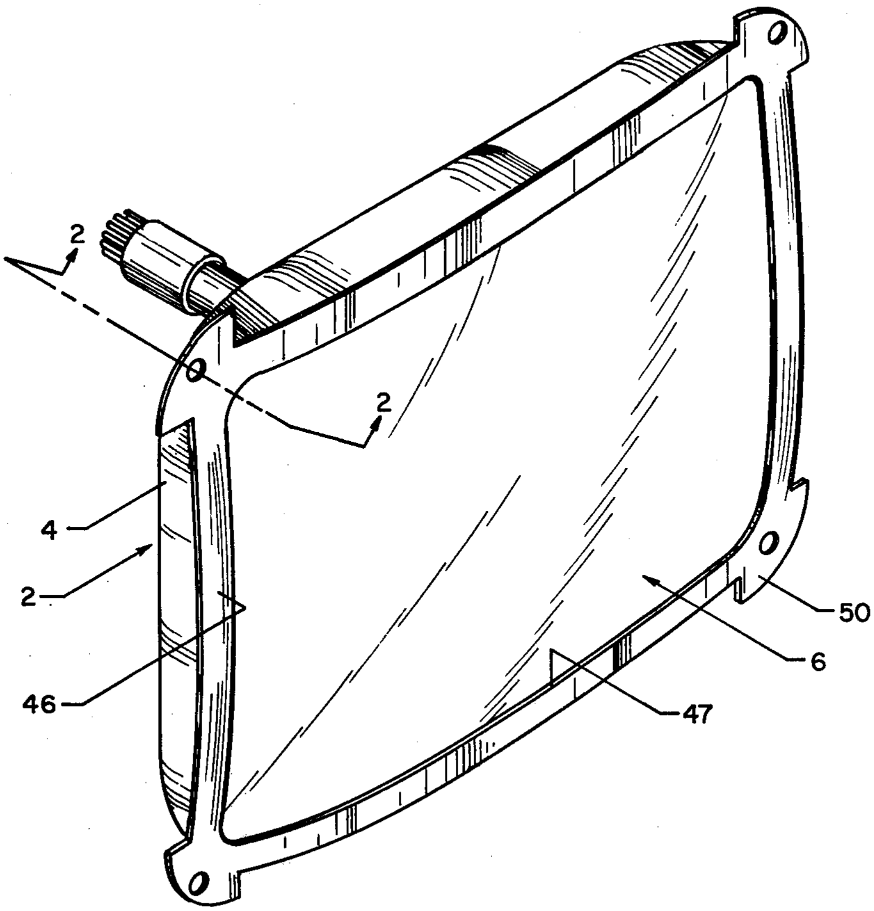
FIG. 1 is a schematic front perspective view of a unique color cathode ray tube embodying the present invention.
Figure 2:
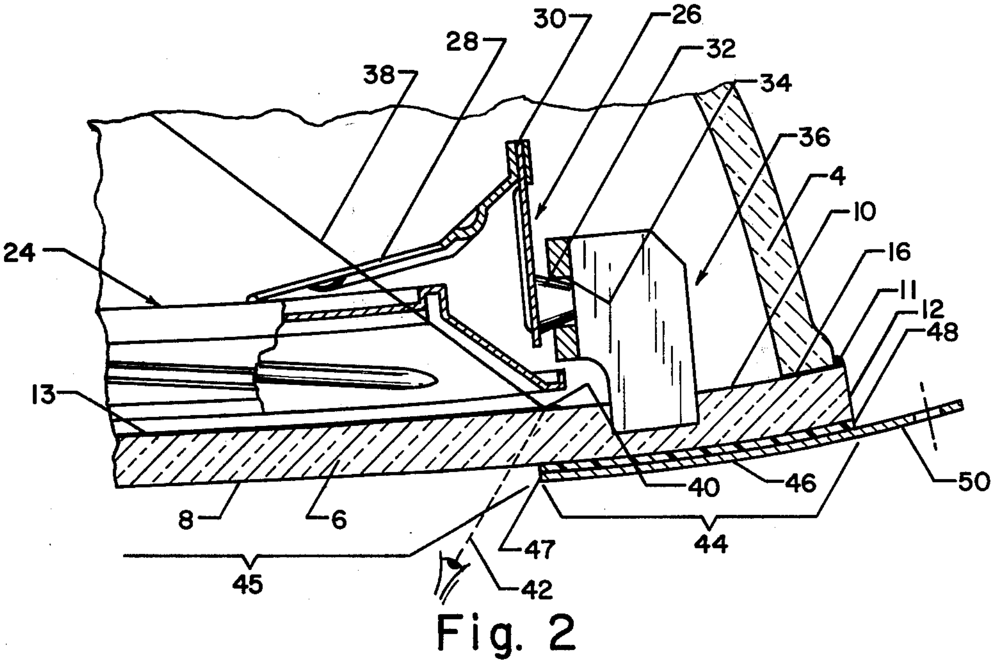
FIG. 2 is an enlarged schematic fragmentary side sectional view of the FIG. 1 tube taken along lines 2—2 in FIG. 1, indicating the non-viewing area of the faceplate front surface.

Whereas the invention may be implemented in color cathode ray tubes of various types, it is preferably embodied in a tube of the nature shown in FIGS. 1&2 which is disclosed in U.S. Pat. No. 3,894,260, issued to the assignee of this application.

The faceplate of a conventional tube has a deep flange which extends rearwardly from a front surface, whereas in the unique tube mentioned above no such flange exists. The side surface of the faceplate which extends rearwardly from its front surface spans the thickness dimension of the faceplate. This unique tube will now be described in more detail.

The tube 2 has an envelope comprising a funnel 4 sealed to a flangeless faceplate 6. The unique construction of the faceplate 6 without a flange permits economies in manufacture of the envelope and simplified and economical screening and assembly processes. The faceplate 6 has a curved configuration which may be spherical, multi-radial, cylindrical, or of other suitable curvature. The faceplate 6 has a convex front surface 8 connected to a concave rear surface 10 by a peripheral edge surface 12. The edge surface 12 is contoured, that is, the edge surface portions along sides of the faceplate depart from and return to a plane connecting the four corners of the faceplate.

The funnel 4 has a convex seal land, herein intended to mean a seal land which lies on an imaginary curved surface, which surface curvature may be spherical, multi-radial, cylindrical, or of other suitable curved configuration. The seal land of the funnel 4 is curved to match and mate with the concave rear surface 10 of the faceplate 6 along a sealing interface 16. The seal land of the funnel 4 is hermetically bonded to the rear surface 10 of the faceplate 6 by a devitrifying glass solder, herein termed a "frit material" 11.

The concave rear surface 10 of the faceplate 6 is here shown as being slightly larger than the wide end of the funnel 4 to which the faceplate 6 is attached. Thus, when the tube 2 is assembled, the faceplate overhangs the funnel slightly. Alternatively, the faceplate edge surface 12 may be flush with the outside surface of the funnel 4.

As shown in FIG. 2, a suspension system of unique construction is provided for supporting a shadow mask 24 in peripheral corner regions of the rear surface 10 of the faceplate 6. The suspension system shown is not the subject of this application, being described and claimed in certain of the referent patents and co-pending applications.

The suspension system is illustrated as comprising four suspension devices 26, one at each peripheral corner region of the mask 24. The shadow mask 24 is constructed so as to be relatively rigid with respect to its major and minor axes, but less rigid with respect to its diagonals. By mounting the suspension devices 26 at the corners of the mask 24, deviations in the faceplate 6 with respect to the faceplate diagonals are followed by corresponding flexure of the shadow mask 24 so as to maintain a constant "Q" spacing, i.e., a constant spacing between the central apertured portion of the shadow mask 24 and the concave rear surface 10 of the faceplate 6 which carries a phosphor screen 13. The suspension devices 26 each shown as comprising a bracket 28 mounted on a corner of the mask 24 which carries a leaf spring 30. The spring 30 is relatively weak, but laterally stiff (in its own plane). The spring 30 carries on its distal end a lug 32 which is received within a lug-receiving opening 34 in a faceplate-mounted stud 36 when the mask 24 is mounted in its operative position on the faceplate 6.

The present invention will now be discussed. As described, relevant commercial prior art systems used on conventional flanged faceplate tubes followed one of three approaches: (1) the "rimbond" approach; or (2) the "tension band" approach; or (3) the "face shield" approach. The referent copending application Ser. No. 623,853 filed Oct. 20, 1975 teaches a fourth basic approach (therein termed the "edgebond" approach), wherein the edge surface of a flangeless faceplate in a tube of the unique type described above, is bound up by a cemented frame. This invention teaches a unique fifth basic approach to implosion protection. For the first time, by this invention, there is provided a facebond implosion protection system for a color CRT in which only a peripheral portion of the front surface of the faceplate of a tube is bound up and held by a cemented frame. A novel facebond implosion protection system constructed according to this invention is illustrated in FIGS. 1–2.

The faceplate of the unique tube described above has a rectangular central area through which television pictures are viewed and a relatively wide peripheral non-viewing area which surrounds the central area and overlies the mask suspension studs. This non-viewing area occurs because of the unique construction of the tube and the use of a corner mask suspension system with studs occupying areas in the four corners of the rear surface of the faceplate, as is illustrated in FIG. 2. The greatest angle electron trajectory 38 of the tube 2 intersects the edge of the phosphor screen 13 at point 40. The viewer observes the light emitted from point 40 on the phosphor screen 13 along a sight line 42. The distance from the intersection of the viewer's line of sight 42 with the convex front surface 8 to the edge surface 12 of the faceplate 6 is herein defined as the peripheral non-viewing area 44 of the front surface of the faceplate. The remaining (central9 area (central) of the faceplate front surface 8 through which the television pictures are viewed is herein termed the central viewing area of the front surface of the faceplate. On a 19 inch color television picture tube of the character described, this non-viewing area 44 is approximately 1¼ inches wide.

A metal high tensile strength frame 46 has a curvature corresponding to the curvature of the faceplate front surface 8 and has substantially the same rectangular shape and size as the faceplate 6. Also, the frame 46 has a substantially rectangular central window, defined by inner edge 47 of the frame 46, which is at least as large as the viewing area 45. The window in the frame does not extend over the peripheral corner regions occupied by the studs 36.

The frame 46 is bonded by a cement 48 to a substantial portion of the non-viewing area 44 on the front surface 8 so as to environ the viewing area 45 of the faceplate 6. The frame 46 thus forms a "picture-frame" for the viewing area. It is permissable for the frame 46 to be slightly larger or slightly smaller than the size of the faceplate 6. It should be noted that in the conventional tube, there is a minimal peripheral non-viewing area and therefore, a facebond implosion protection system would not be feasible for a conventional tube, unless a smaller phosphor screen would be used than is normally manufactured.

Transparent face shields covering the entire surface of the faceplate and bonded to that surface with a clear resin are old in the art. In the present embodiment, the frame 46 surrounds the viewing area 45 and, being of metal, is of course opaque. Never before to my knowledge has an implosion protection system been comprised of a frame or other member which is bonded solely on a peripheral area of the front surface of a faceplate of a color television picture tube.

Surprisingly, it has been found that effective implosion protection is provided by the bonded frame described above. A frame according to this invention offers significant economies compared, e.g., with rimbond systems, not only in frame cost, but more importantly in the amount of costly cement required to bond the frame to the tube. In the disclosed embodiment, only a thin layer of epoxy is needed, whereas in prior art rimbond systems, large amounts of epoxy is used to fill the gap between the tube and the rimbond frame.

In effect, the facebond structure according to this invention holds together the pieces of the faceplate when it is shattered long enough to allow air to enter the tube 2 slowly.

The internal pressure in the tube is thus caused to increase gradually, preventing unacceptable amounts of glass fragments from being thrown forwardly from the shattered tube.

As illustrated in FIGS. 1–2, mounting tabs 50 for attaching the tube 2 to a cabinet may be included as part of the frame 46. In the preferred embodiment the tabs 50 extend from the corners of the frame 46 and have provisions, such as holes, for permitting attachment of the tube to the cabinet. Alternatively, these tabs could be placed anywhere about the frame or formed in a way which would best suit the type of cabinet being used.

Figure 3:
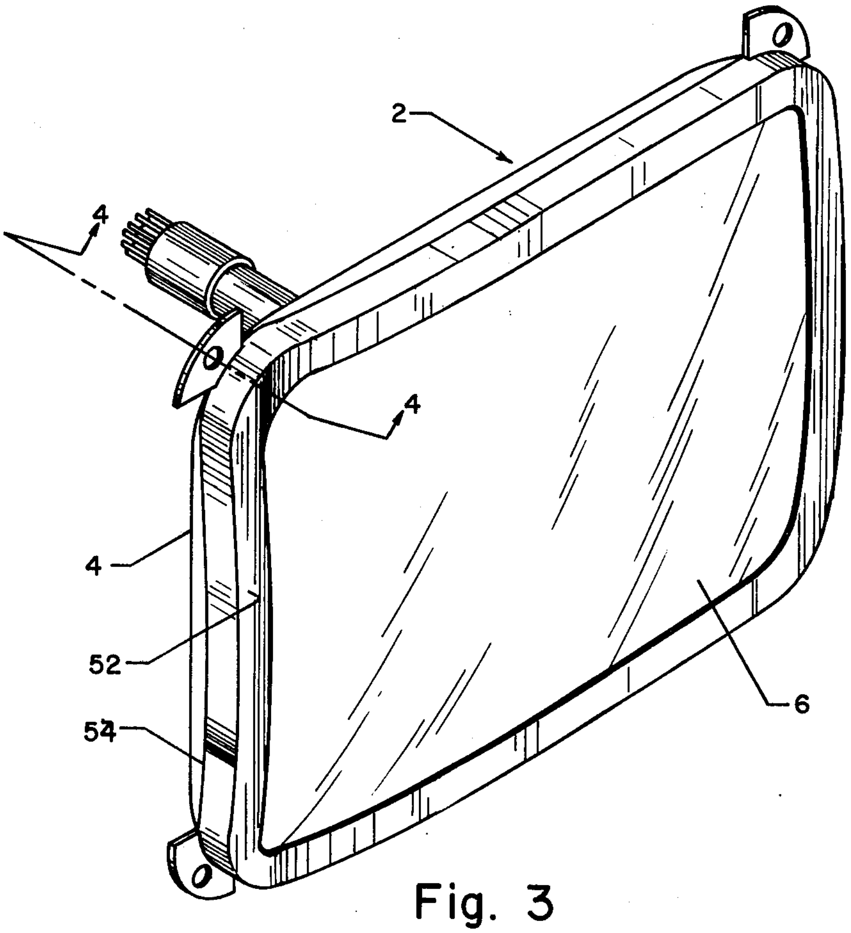
FIG. 3 is a schematic front perspective view of another tube embodying the teachings of this invention wherein a novel frame extends also around the edge surface of the faceplate.
Figure 4:
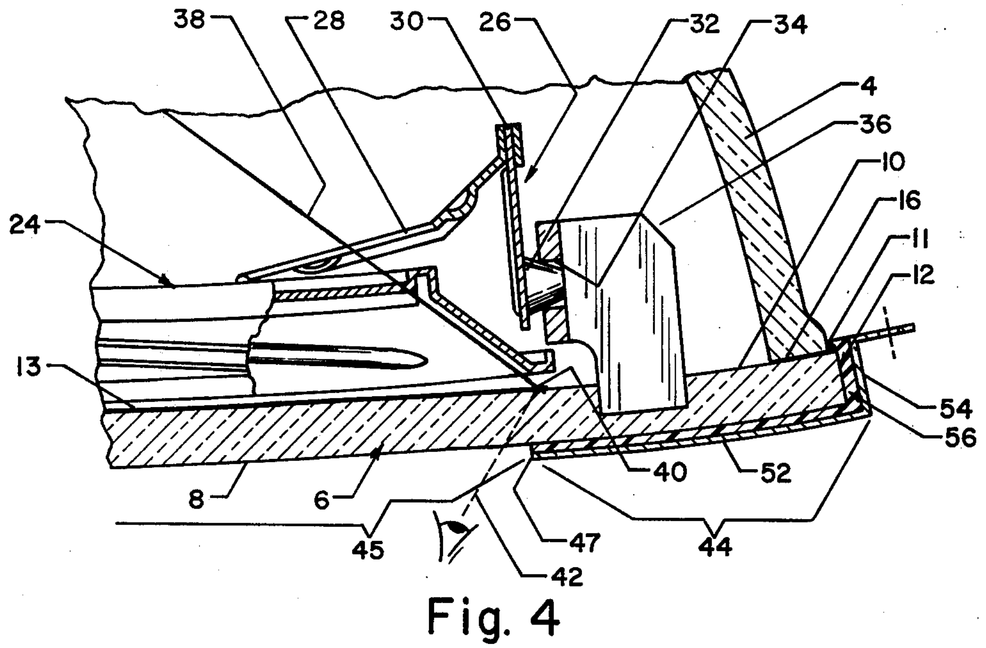
FIG. 4 is an enlarged schematic fragmentary side sectional view of the FIG. 4 tube, taken along lines 4—4 in FIG. 3.

An alternative embodiment is illustrated in FIGS. 3&4. The FIGS. 3–4 embodiment is similar to the FIGS. 1–2 embodiment, comprising a facebond frame 52 mounted to the peripheral non-viewing portion 44 of the front surface 8 of faceplate 6. The FIGS. 3–4 embodiment differs from the FIGS. 1–2 embodiment, however, by the provision of a flange 54 extending rearwardly from the frame 52. The flange is preferably, though not necessarily, cemented to the edge surface 12 of the faceplate 6. The flange 54 serves a number of important functions. First, the flange protects the edge surface 12 of the faceplate 6 from being chipped during tube manufacture and subsequent handling. Second, the flange 54, when bonded to the peripheral edge surface 12 of the faceplate 6 (as is preferred) provides added implosion protection for the tube 2. The bonding of the flange 54 to the side surface 12 of the faceplate 6 may be accomplished by the use of an epoxy cement 56, such as a thixotropic epoxy, introduced between the frame 52 and tube 2 at the peripheral non-viewing area 44 of the faceplate front surface 8, along the side surface 12 of the faceplate 6, and overlying the sealing interface 16 and frit material 11.

As taught by the referent co-pending application Ser. No. 623,853, filed Oct. 20, 1975, effective implosion protection can be provided solely by the provision of an edgebond shallow frame system which binds up only the edge surface 12 of the faceplate. The FIGS. 3–4 embodiment combines the implosion protection afforded by the novel facebond system of this invention and that afforded by the edgebond system.

Underwriters Laboratories Incorporated ("UL") sets the standards for implosion protected cathode ray tubes for television receiving equipment. The test employed by UL is generally as follows: The color television picture tube is mounted in a test cabinet enclosure of a specified size (depends on the size of the tube). The cabinet is supported on a 30 inches high, rigid, table-like test stand. Two barriers each ½ inch thick, 9½ inches high and 72 inches long are placed on edge on the floor in front of the test stand. The barriers are located at distances of 3 ft. and 5 ft., respectively, from the plane of the front enclosure of the cabinet. The three areas bounded by the barriers are indicated as follows: Zone 1: 0–3 ft., Zone 2: 3–5 ft., Zone 3: 5 ft. and beyond.

The ball impact test is defined as follows. An impact is to be applied to any point on the face of the tube 1½ inches away from the edge of the screen area and is to be obtained from a solid, smooth, steel sphere 2 inches in diameter and weighing approximately 1.18 lbs. The sphere is to be suspended by a suitable cord and allowed to fall freely as a pendulum from rest through a distance necessary to cause it to strike with an impact of 5 foot-pounds. The cabinet supporting the cathode ray tube is to be placed so that the surface tested is vertical and in the same vertical plane as the point of support of the pendulum.

When a tube is tested as described above, the amount of glass thrown forward shall not exceed the following: First, there shall be no single piece of glass weighing more than ½ oz. in Zone 2; second, the total weight of all the pieces of glass in Zone 2 shall not exceed 1½ oz.; and third, there shall be no single piece of glass in Zone 3 weighing more than 0.05 oz.

A 19 inch diagonal color television picture tube of the unique type shown in FIGS. 1&2 and described above was constructed and successfully tested. The width of the nonviewing area of the tube was approximately 1¼ inches. The metal frame 46 was steel with a width (overlying the nonviewing area 44 of the faceplate front surface 8) of approximately 1 inch. The thickness of the frame was in the range 0.050 inch to 0.060 inch. The frame was bonded to the faceplate with an epoxy known as Kimcode (TM) resin. For ease of experimentation, the actual frame used extended outwardly slightly beyond the edge of the faceplate, however, it is felt that this extension played no appreciable part in the results of the test.

From preliminary tests, this tube is expected to pass the afore-discussed UL test. It was found that frames of greatly reduced widths or thicknesses would not provide sufficient implosion protection based on the UL test requirements.

The invention is not limited to the particular details of construction of the device depicted and other modifications and applications are contemplated. For example, whereas the above-depicted embodiment included an approximately spherical or multi-radial faceplate, the invention may be applied to other types of tubes having a contoured faceplate edge surface and sealing interface—e.g., a tube having a flangeless cylindrical faceplate. Frames of materials other than steel may be employed so long as adequate widths and strengths are provided. Flanges of depths other than as shown in FIGS. 4–5 may be employed. Suitable cements other than the epoxy type may be used. Certain other changes may be made in the above-described device without departing from the true spirit and scope of the invention herein involved. It is intended therefore, that the subject matter in the above-depiction shall be interpretative as illustrative and not in a limiting sense.

What is claimed is:

1. A rectangular, shadow mask type color television picture tube including a glass tube with a flangeless curved faceplate which has a concave rear surface with a phosphor screen deposited on a central portion thereof, and shadow mask suspension elements located on said rear surface in each peripheral corner region of said faceplate, said glass bulb also having a funnel which mates with said concave rear surface of said faceplate to define a sealing interface, said faceplate having a convex front surface with a rectangular central area through which television pictures are viewed and a relatively wide peripheral non-viewing area surrounding said central viewing area and overlying said elements, said tube being characterized by having a low cost facebond implosion protection system comprising a high-tensile strength frame having a curvature corresponding to the curvature of said front surface of said faceplate and having substantially the same rectangular shape and size thereof, said frame having a substantially rectangular central window at least as large as said viewing area of said faceplate front surface but not extending over said suspension elements, said frame being firmly bonded to said peripheral non-viewing area of said front surface so as to environ said viewing area thereof and hold together glass fragments of a fractured faceplate.

2. A rectangular, shadow mask type color television picture tube including a glass bulb with a flangeless curved faceplate which has a concave rear surface with a phosphor screen deposited on a central portion thereof, and shadow mask suspension elements located on said rear surface in peripheral corner regions of said faceplate, said glass bulb also having a funnel which mates with said concave rear surface of said faceplate to define a sealing interface, said faceplate having a convex front surface with a rectangular central viewing area through which television pictures are viewed and a relatively wide peripheral non-viewing area surrounding said central area and overlying said elements, said tube being characterized by having a low cost facebond implosion protection system comprising a metal high-tensile strength frame having a curvature corresponding to the curvature of said front surface of said faceplate and having substantially the same rectangular shape and size thereof, said frame having a substantially rectangular central window at least as large as said viewing area of said faceplate front surface but not extending over said suspension elements, said frame overlying and being firmly bonded only to said peripheral non-viewing area of said front surface so as to environ said veiwing area thereof, implosion protection being provided for said tube solely by the effect of said frame bonded to said peripheral non-viewing area of said front surface of said faceplate.

3. A rectangular, shadow mask type color television picture tube including a glass bulb with a flangeless curved faceplate which has a concave rear surface with a phosphor screen deposited on a central portion thereof, and shadow mask suspension elements located on said rear surface in peripheral corner regions of said faceplate, said glass bulb also having a funnel which mates with said concave rear surface of said faceplate to define a sealing interface, said faceplate having a convex front surface with a rectangular central viewing area through which television pictures are viewed and a relatively wide peripheral non-viewing area surrounding said central area and overlying said elements, said faceplate also having a peripheral edge surface connecting said convex front surface and said concave rear surface of said faceplate, said tube being characterized by having a low cost facebond implosion protection system comprising a metal high-tensile strength frame having a curvature corresponding to the curvature of said front surface of said faceplate and having substantially the same rectangular shape and size thereof, said frame having a flange which overlies said peripheral edge surface to prevent chipping thereof, said frame also having a substantially rectangular central window at least as large as said viewing area of said faceplate front surface but not extending over said elements said frame being firmly bonded to said peripheral non-viewing area of said front surface so as to environ said viewing area thereof and hold together glass fragments of a fractured faceplate.

4. The combination defined by claim 3 wherein said flange of said frame is bonded to said peripheral edge surface of said faceplate for providing additional implosion protection.

* * * * *